United States Patent Office 3,271,475
Patented Sept. 6, 1966

3,271,475
CATALYTIC POLYMERIZATION OF OLEFINS
TO LIQUID POLYMERS
William E. Weesner, Dayton, Ohio, assignor to Monsanto
Company, a corporation of Delaware
No Drawing. Filed Sept. 30, 1963, Ser. No. 312,310
16 Claims. (Cl. 260—683.15)

This application is a continuation-in-part of copending and now abandoned application Serial No. 8,497, filed February 15, 1960.

This invention relates to cobalt oxide-Group VB or VIB metal oxide-active carbon catalysts for the polymerization of olefins to higher boiling liquid polymers, and to the polymerization of olefins in contact with said catalyst.

It is known that cobalt oxide-activated carbon catalysts can be used to polymerize olefins to form higher boiling liquid polymers. However, the polymer formed using such catalysts comprises primarily the 2-olefins, even when the olefinic reactant is made up of essentially 1-olefins. Apparently, the cobalt oxide-activated carbon catalyst possesses a high double bond isomerization activity so that any 1-olefins which may be formed by polymerization are isomerized into the 2-olefins and the yield of 1-olefins is very low or non-existent. Since the higher-boiling 1-olefins are very useful as chemical intermediates in esterification reactions, oxo reactions, and polymerization reactions to form solid polymers, it is desirable to produce higher 1-olefins from the lower chain olefins.

I have discovered that the yield of liquid olefins can be increased in a polymerization process wherein lower olefins having from 2 to about 10 carbon atoms are contacted with a mixed metal oxide on activated carbon or adsorbent carbon catalyst wherein the metal oxides impregnated into the carbon are cobalt oxide and an oxide of a metal of Group VB or VIB of the Periodic Table.

An object of this invention is to provide a process for catalytically polymerizing olefins to form normally liquid polymers.

Another object of this invention is to provide an improved process for polymerizing the normally gaseous olefins to form normally liquid polymers utilizing a cobalt oxide-activated carbon-Group VB or VIB metal oxide catalyst.

Another object of this invention is to provide a process for catalytically polymerizing the normally gaseous olefins utilizing a cobalt oxide-Group VB or VIB metal oxide-activated carbon catalyst to produce a larger yield of 1-olefins than is obtained from a cobalt oxide-activated carbon catalyst not containing a Group VB or VIB metal oxide.

Another object of this invention is to provide a process for catalytically polymerizing normally internal olefins utilizing a cobalt oxide—Group VB or VIB metal oxide—activated carbon catalyst to produce a larger yield of liquid olefin product than is obtained from a cobalt oxide-activated carbon catalyst not containing a Group VB or VIB metal oxide.

Other aspects, objects and advantages of the invention are apparent from a consideration of the accompanying disclosure and the appended claims.

According to the present invention, normally gaseous mono-olefin hydrocarbons are catalytically polymerized in a markedly improved manner to form liquid polymeric materials, especially 1-olefins, for example, the production of 1-hexene by the polymerization of ethylene. The catalyst utilized in the improved polymerization process of this aspect of the invention comprises cobalt oxide, a Group VB or VIB metal oxide, preferably molybdenum and an activated or adsorbent carbon in suitable catalytic proportions. It is believed that the presence of the Group VB or VIB metal oxide in the cobalt oxide-adsorbent carbon catalyst composition reduces the tendency of the catalyst to cause double bond isomerization and, therefore, permits the formation of a liquid polymer containing a larger proportion of 1-olefins than has heretofore been possible with a catalyst containing only cobalt oxide and adsorbent carbon.

Also according to this invention low boiling liquid straight-chained mono-olefins are catalytically polymerized in a markedly improved manner to form liquid polymeric materials, the major proportion of which are straight-chained mono-olefins, for example the production of normal dodecenes by the polymerization of mixed normal hexenes. The catalyst utilized in the improved polymerization process of this aspect of the invention comprises cobalt oxide, a Group VB or VIB metal oxide, preferably $Cr_2O_3$ or $CrO_3$, and an activated or adsorbent carbon in suitable catalytic proportions.

The adsorbent carbon or activated carbon component of the catalyst composition of this invention serves primarily as a support for the cobalt oxide and the Group VB or VIB metal oxide; however, the adsorbent carbon is also an active component of the catalyst composition and, therefore, is more than just a support. In fact, replacement of the activated carbon component with one of the usual catalyst supports, such as alumina or silica-alumina, does not produce an effective catalyst for the polymerization of olefins to liquid polymers. The adsorbent carbon component employed in this invention should have high surface areas, usually above about 400 square meters per gram. A particularly fine activated carbon for use in this invention is coconut charcoal, however, charcoal derived from wood is also very useful. If desired, a carbon component manufactured from petroleum coke can also be used. Also, carbon black, particularly furnace type carbon black, may also be used in pelleted form. Generally, the activated carbon component is utilized in the form of particulate pellets upon which the metal oxides are deposited; that is, powdered intimate admixtures of the metal oxides and activated carbon component have not been found useful in the process of this invention.

The metal oxide components of the catalyst of this invention comprise cobalt oxide and the oxide of a metal of Group VB or VIB of the Periodic Table; that is, molybdenum, chromium, tungsten, and vanadium. The Periodic Table referred to in this specification is to be found on pages 448–9 of the 41st edition of the Handbook of Chemistry and Physics. The proportion of the metal oxide components incorporated into the catalyst of this invention may vary over a very wide range, but, generally, the total amount of cobalt oxide and Group VB or VIB metal oxide employed ranges from 2 to 25% by weight of the finished catalyst. The proportion of cobalt oxide and Group VB or VIB metal oxide can also vary over wide ranges. Catalyst compositions containing as little as about 1% by weight of cobalt oxide (about 1 mole percent) per hundred grams of catalyst composition with the balance of the 2% to 25 weight percent of metal oxides being the oxide of molybdenum, chromium, tungsten or vanadium, on the carbon support may be used. For the polymerization of normally gaseous mono-olefins, the mole ratio of cobalt oxide to Group VB or VIB metal oxide is preferably from 1:1 to as high as 6:1, and even higher and lower mole ratios can be used with less advantageous results. For polymerizing low boiling liquid olefins to liquid dimer products using these catalysts the mole ratio of cobalt oxide to Group VB or VIB metal oxide on carbon can be somewhat lower and still obtain good conversions and high productivities (g. liquid product/g. of catalyst/hr.). Generally the cobalt oxide to Group VB or Group VIB metal oxide mole ratio may be as low as about 1:8 (1% CoO; 12% $Cr_2O_3$) and as high as about 8:1 but it is preferred that the mole ratio be in the range of about 1:2 to 3:1 of cobalt oxide to the Group VB or VIB metal oxide, the optimum amount varying somewhat depending upon the metal oxide used. For liquid olefin dimerization to liquid products, it is preferred to use a chromium oxide in combination with the cobalt oxide on the activated carbon support. Optimum weight percents of cobalt oxide (as CoO) and chromium oxide appear to be in the range of from about 5% to about 10% by weight of cobalt oxide to from about 5% to about 8% of the chromium oxide expressed either as the $Cr_2O_3$ or $CrO_3$.

The cobalt oxide and the Group VB or VIB metal oxide can be present in the catalyst composition as either an admixture of the separate cobalt oxide and the Group VB or VIB oxide, i.e., $CoO \cdot MoO_3$, or as a chemical compound of the cobalt and Group VB or VIB metal oxide, i.e., cobalt molybdate, $CoMoO_4$.

The catalysts of this invention may be prepared by a variety of chemical routes, the essential feature of the preparation being to obtain the oxidized form of the Group VB or VIB metal and the cobaltous form of cobalt oxide deposited on the activated carbon component. Essentially the catalyst preparation involves the double decomposition reaction of cobaltous nitrate with an ammonium Group VB or VIB metal salt to form ammonium nitrate and removal of the ammonium nitrate thus formed to obtain the cobalt and Group VB or VIB metal in the desired oxide forms. As a preferred method of preparation, activated carbon particles are successively impregnated with cobaltous nitrate and ammonium Group VB or VIB metal salt solutions, with a drying step between each impregnation step, and activated by heating the impregnated catalyst at an elevated temperature in an inert atmosphere. For example, a cobaltous molybdate catalyst is prepared by impregnating charcoal with a solution of ammonium paramolybdate tetrahydrate,

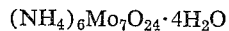

in water containing a sufficient amount of ammonia to permit the conversion of the ammonium paramolybdate tetrahydrate to ammonium molybdate, $(NH_4)_2MoO_4$. This impregnated charcoal is then air dried at a temperature in the range of from 10° C. to 100° C., preferably at room temperature, before being impregnated with the cobaltous nitrate. If desired, additional ammonium molybdate may be deposited on the charcoal by repeating the impregnation with the ammonium paramolybdate tetrahydrate solution. After the desired amount of ammonium molybdate has been deposited on the charcoal, the dried impregnated charcoal is then impregnated with an aqueous solution of cobaltous nitrate,

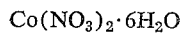

in an amount sufficient to obtain the desired cobalt oxide-molybdenum oxide ratio in the final catalyst composition. After this impregnation step, the catalyst is dried at a temperature in the range of 100°–175° C. in a vacuum oven. If desired, the impregnation step with the cobaltous nitrate can be repeated any number of times; however, if the catalyst is to be impregnated several times with the cobaltous nitrate, the drying step is conducted at a somewhat lower temperature, usually in the range of from 75° C. to 125° C. Although it is preferred to impregnate the charcoal first with the Group VB or VIB metal salt solution, followed by impregnation with the cobaltous nitrate solution, the order of impregnations can be reversed and, if desired, alternated where several impregnations of either one or both metal salt solutions are employed.

The activation of the polymerization catalysts of this invention is effected by heating the impregnated catalysts at an elevated tempertaure in the absence of oxygen-containing gases. The activation of the catalysts effects decomposition of the ammonium nitrate formed in the preparation of the catalyst by converting the ammonium nitrate into gaseous ammonia and nitrogen oxides which are readily removed. Although the activation can be carried out at temperatures below 200° C., it is usually desirable to use a temperature somewhat above 200° C. in order to accomplish the activation in a reasonable period of time. Usually the activation temperature is maintained below 500° C., although somewhat higher temperatures can be used under carefully regulated conditions without adversely affecting the activity of the catalyst. The activation of the catalysts can be conducted under low pressure or vacuum conditions wherein the ammonia and nitrogen oxides formed are merely removed. Other methods of activating the catalysts involve passing a stream of an inert gas, such as nitrogen, helium, or argon, over the catalysts at an elevated temperature in the desired temperature range. Preferably, the catalysts are activated by heating in a stream of nitrogen.

When the catalyst composition is to be used in polymerizing the normally gaseous alpha-olefins, it is preferred that the dried catalyst composition be activated by heating it in an inert atmosphere, e.g., nitrogen, to from about 200° C. to about 325° C. When the catalyst is to be used to dimerize normally liquid olefin feeds to liquid products, it is preferred to activate the catalyst in an inert atmosphere by heating in the higher part of the above stated range, i.e., generally at least about 350° C. to 500° C. The time required for effecting activation of the catalysts will vary widely, depending upon the nature of the catalysts and the temperature selected for activation, however, the catalysts are usually activated in a period of from 2 to 10 hours' duration. The initial activation of the catalysts cannot be conducted in a stream of hydrogen unless very low activation temperatures are used because the metal salts are in a form which are very readily reduced. However, a particularly selective catalyst can be formed by heating an activated catalyst in a stream of hydrogen at a temperature of 200° C. for a period of approximately 2 hours.

The novel catalysts of this invention can be employed in various forms and sizes such as pellets, granules, powders, broken pieces and lumps. A convenient form in which the catalysts may be employed is as granules of from about 20 to 100 mesh size range.

In effecting the process of my invention, temperatures within the range of about −10° C. to 250° C. can be employed although more often the operating temperature is selected between about 100° C. and 200° C. In fact, very good conversions of ethylene to 1-olefin are obtained at temperatures of approximately 200° C., whereas similar catalysts not containing a Group VB or VIB metal oxide do not give particularly good conversions to 1-olefins in these temperature ranges.

For the dimerization of propylene to $C_6$ olefin products the preferred temperature range is from about 25° C. to about 85° C. For the polymerization of liquid olefin feed stocks using these catalysts it is preferred to use temperatures ranging from about 70° to about 200° C. The polymerization process can be effected at autogenous pressures; however, usually pressures above 200 p.s.i.g. are used in order to avoid the use of higher temperatures and longer reaction times. Ordinarily, the pressure is maintained below 10,000 p.s.i.g. even though pressures above this figure may be used if desired. In general, it is only necessary that the pressure be sufficient to maintain liquid phase in the reaction zone, although high pressures favor the polymerization reaction. The polymerization reactions can be carried out in either batch or continuous flow reactors. In carrying out the reaction under continuous flow conditions, the liquid hourly space velocity is preferably maintained less than 1. In effecting batch polymerization, the operating period may range from about 3 to about 20 hours.

It is usually desirable to carry out the polymerization reaction of this invention in an inert reaction medium or solvent, such as a saturated aliphatic hydrocarbon or an aromatic hydrocarbon. The saturated aliphatic hydrocarbon may contain from 5 to 12 carbon atoms and include, for example, pentanes, hexanes, heptanes, octanes, dodecanes, cyclohexane, and the like. Suitable aromatic solvents include toluene, xylenes, ethyl benzenes, tetrahydronaphthylene, trimethylbenzene, and the like. Benzene can also be used as a solvent; however, it is less desirable because of difficulties in separation from the polymerization product. Other solvents can also be used in the process of this invention provided that they are relatively inert, readily separated from the polymerization effluent, and exist as a liquid phase under the selected reaction conditions.

Polymerization reactions utilizing the novel catalyst of this invention may be performed with the normally gaseous olefins to be found in either refinery gases or elsewhere.

Polymerization reactions with these catalysts may also be performed with the normally liquid lower monoolefins having up to, say 10 carbon atoms containing the olefinic carbon to carbon double bond in either a terminal or internal position. When internal olefins, such as 2-olefins are polymerized according to the process of this invention, it is preferred to use in the process a catalyst which has been activated by heating in the higher part of the above stated temperature range. Suitable olefins include ethylene and propylene. The olefinic feed stock can also contain inert hydrocarbons, such as paraffins.

The advantages, desirability and usefulness of the present invention are illustrated by the following examples.

*Example 1*

In this example, a cobalt oxide-activated carbon catalyst was prepared without including the Group VIB metal oxide component and used to effect polymerization of ethylene. In the preparation of the catalyst, 150 g. of Pittsburgh Coke and Chemical Co. Type BPL activated carbon was treated with an aqueous cobaltous nitrate solution containing $Co(NO_3)_2 \cdot 6H_2O$ dissolved in 300 cc. of water. After heating the carbon and cobaltous nitrate solution for approximately 1 hour in a steam bath, approximately ½ of the water was removed by evaporation under vacuum. The remaining liquid was then drained off and the wet carbon recovered was dried in a vacuum oven using an initial temperature of 80° C. raised 10° every hour to reach a final temperature of 145° C., which temperature was maintained constant for 1.5–2 hours. The catalyst was then activated by heating slowly from a temperature of 42° C. to a temperature of 300° C. during a period of 7 hours under an atmosphere of $N_2$ at a pressure of 65 mm. Hg.

This cobalt oxide-activated carbon catalyst was used to polymerize ethylene in a 1300 ml. high pressure reaction vessel. The reaction vessel was flushed out with a nitrogen stream before placing 57 g. of the cobalt oxide-activated carbon catalyst, 80 g. of toluene solvent and 305 g. of ethylene therein. The reaction vessel was then sealed and heated for a period of approximately 7 hours while maintaining the temperature in the reaction zone within the range of 85–95° C. The pressure was maintained in the range of 700–900 p.s.i. by periodic addition of ethylene. Upon completion of the reaction, the pressure vessel was opened and the liquid reaction product poured out leaving the catalyst in the bottom of the reaction vessel. The reaction product was distilled at substantially atmospheric pressure to obtain 246 g. of a $C_6$ fraction boiling at 67–70° C., which is a yield of 43.8%. Analysis of this $C_6$ fraction was as follows:

| | Percent |
|---|---|
| 1-hexene | 6.4 |
| Trans-3-hexene | 35.0 |
| Trans-2-hexene | 28.3 |
| 2-ethyl-1-butene | 3.1 |
| Cis-2-hexene | 12.9 |
| Trans-3-methyl-2-pentene | 7.9 |
| Cis-3-methyl-2-pentene | 6.4 |

This example clearly shows that the cobalt oxide-activated carbon catalyst was effective in the polymerization of ethylene to form liquid polymer but that the polymer formed was primarily a 2- or 3-olefin instead of the preferred 1-olefin.

*Example 2*

A $CoMoO_4$ catalyst was prepared by impregnating 200 g. of BPL charcoal with an aqueous solution of ammonium paramolybdate tetrahydrate containing 20 g. of $(NH_4)_6Mo_7O_{24} \cdot 4H_2O$, 7.6 g. of concentrated ammonium hydroxide, and 200 ml. of water. After partially drying the impregnated charcoal under vacuum on a hot water bath, the impregnated charcoal was further air dried overnight, followed by drying in a vacuum oven at a temperature of 70° C. for a period of 1 hour. A portion of this impregnated charcoal in an amount of 30 g. was then impregnated with an aqueous solution of cobaltous nitrate containing 4.1 g. of $Co(NO_3) \cdot 6H_2O$ and 20 ml. of water. After impregnating, the charcoal was evacuated to insure penetration of the liquid into the pores, air dried overnight, and then finally dried in a vacuum oven at a temperature of 110–130° C. for several hours. For use in polymerizing ethylene, this catalyst was activated by heating at a temperature of 415–530° C. for a period of 4.5 hours in an atmosphere of $N_2$. This catalyst contained 11 wt. percent combined $CoO$ and $MoO_3$ and the ratio of cobalt oxide to molybdenum oxide was found to be 1:1 based on the 0.00054 mole of $CoO$ per gram of catalyst and the 0.00054 mole of $MoO_3$ per gram of catalyst present.

The polymerization was carried out in a 300 ml. pressure vessel into which was placed 10.1 g. of the activated catalyst, 86 g. of ethylene, and 5 ml. heptane as a solvent. The polymerization was carried out at a temperature of 85° C. for a period of 3.5 hours followed by further heating a temperature of 110° for a period of 9 hours under a pressure of from 1100 to 1800 p.s.i. Upon completion of the polymerization, the pressure vessel was opened and the liquid polymer poured off from the catalyst for purification by distillation. Analysis of the $C_6$ fraction was as follows:

| | Percent |
|---|---|
| 1-hexene | 19.6 |
| Trans-3-hexene | 20.6 |
| Trans-2-hexene | 37.9 |
| Cis-2-hexene | 14.1 |
| Trans-3-methyl-2-pentene | 3.4 |
| Cis-3-methyl-2-pentene | 4.4 |

The $C_4$ fraction contained 23% 1-butene.

*Example 3*

In this example, a $CoO \cdot MoO_3$-activated carbon catalyst was prepared from 25 g. of the charcoal of Example 2 impregnated with ammonium paramolybdate tetrahydrate. This partially impregnated charcoal was heated at a temperature of 480° C. under $N_2$ to convert the $(NH_4)_2MoO_4$ to $MoO_3$. A portion of this $MoO_3$-active carbon catalyst in an amount of 12.5 g. was then impregnated with an aqueous solution of cobaltous nitrate containing 3 g. of $Co(NO_3)_2 \cdot 6H_2O$ and 9 ml. of water. After impregnation, excess water was distilled off under reduced pressure at room temperature, followed by further drying in a vacuum oven at a temperature of 80–150° C. for a period of fifteen hours. Before use, the catalyst was activated by heating at a temperature of 340° C. for a period of 3.5 hours in a nitrogen atmosphere. This catalyst contained 13 wt. percent combined CoO and $MoO_3$ and the ratio of cobalt oxide to molybdenum oxide was approximately 2:1 based on 0.0008 mole of CoO per gram of catalyst and 0.00053 mole of $MoO_3$ per gram of catalyst.

The activated catalyst was used in the polymerization of ethylene with the polymerization being conducted in a 300 ml. high pressure reaction vessel containing 7.2 g. of the catalyst, 10 ml. of toluene solvent, and 63 g. of ethylene. After sealing the reaction vessel, the reaction mixture was heated at a temperature of 90° C. for a period of 4 hours at a pressure in the range of from 300 to 900 p.s.i. Upon completion of the polymerization, the pressure vessel was opened and the liquid polymer poured off for purification by distillation. The yield of $C_6$ hydrocarbons was 26.1% and the analysis of this $C_6$ fraction was as follows:

| | Percent |
|---|---|
| 1-hexene | 12.2 |
| Trans-3-hexene | 30.4 |
| Trans-2-hexene | 35.7 |
| Cis-2-hexene | 13.5 |
| Trans-3-methyl-2-pentene | 2.3 |
| Cis-3-methyl-2-pentene | 2.1 |
| 2-ethyl-1-butene | 3.2 |

The $C_4$ fraction, obtained in 26.6% yield, contained 48.5% 1-butene.

Example 4

In this example, the catalyst was prepared by impregnating 200 g. of BPL charcoal with an aqueous ammonium paramolybdate solution containing 12.3 g. of $(NH_4)_6Mo_7O_{24} \cdot 4H_2O$, 4.7 g. of concentrated ammonium hydroxide, and 185 ml. of water. The impregnated charcoal was then air dried before being impregnated with cobaltous nitrate. In the second impregnation step, 30 g. of the charcoal was contacted with an aqueous solution containing 2.4 g. of cobaltous nitrate hexahydrate in 10 ml. of water. After evacuating to assist penetration into the pores, the impregnated charcoal was air dried several hours and then heated at 80–150° C. in a vacuum oven overnight. Before use in the polymerization of ethylene, the catalyst was activated by heating at a temperature of 204–330° C. for a period of 2.5 hours in an atmosphere of nitrogen. This catalyst contained 7.6% combined CoO and $MoO_3$ and a cobalt oxide/molybdenum oxide ratio of 1:1 based on 0.00035 mole of CoO per gram of catalyst, and 0.00035 mole of $MoO_3$ per gram of catalyst.

In conducting the polymerization, 93. g. of ethylene, 8.5 g. of toluene solvent, and 4.0 g. of the catalyst were placed in a 300 ml. pressure vessel. After sealing the pressure vessel, the reaction mixture was heated at a temperature of 90° C. for a period of 6.5 hours under a pressure of from 2300 to 3300 p.s.i. Upon completion of the polymerization, the pressure vessel was opened and the liquid polymer poured off for purification by distillation. The $C_6$ fraction recovered in the distillation step had an analysis as follows:

| | Percent |
|---|---|
| 1-hexene | 68.3 |
| Trans-3-hexene | 8.6 |
| Trans-2-hexene | 14.0 |
| Cis-2-hexene | 4.6 |
| Trans-3-methyl-2-pentene | 1.3 |
| Cis-3-methyl-2-pentene | 1.1 |
| 2-ethyl-1-butene | 2.2 |

Example 5

In this example, the catalyst was prepared by impregnating 200 g. of BPL charcoal with an aqueous ammonium paramolybdate solution containing 24.5 g. of $(NH_4)_6Mo_7O_4 \cdot 4H_2O$ 11.4 g. of concentrated ammonium hydroxide, and 150 ml. of water. An additional 45 ml. of water was added to the solution in order to dissolve all of the ammonium paramolybdate. After impregnation, the charcoal was evacuated once and then dried in the air and 40 g. of this impregnated charcoal was further impregnated with a cobaltous nitrate solution containing 6.6 g. of $Co(NO_3)_2 \cdot 6H_2O$ in 15 ml. of water. After the second impregnation step, the charcoal was dried in air in a hood for a period of from 4 to 5 hours. The drying was completed in a vacuum oven at 80–150° C. overnight. Before use in polymerization, the catalyst was activated by heating at a temperature of 240° C.–306° C. in a nitrogen atmosphere for a period of 1.5 hours. This catalyst contained 15.3 wt. percent combined CoO and $MoO_3$ with a ratio of cobalt oxide to molybdenum oxide of 1:1 based on 0.0007 mole of CoO per gram of catalyst and 0.0007 mole of $MoO_3$ per gram of catalyst.

In conducting the polymerization, 55 g. of ethylene, 6.1 g. of the activated catalyst, and 8.2 g. of toluene solvent were placed in a 300 ml. high pressure reaction vessel and heated at a temperature of 150–200° C. for a period of 9.5 hours with a pressure of from 1700 to 2450 p.s.i. After completion of the reaction, the pressure vessel was opened and the liquid polymer was removed for purification by distillation. The $C_6$ fraction which was recovered in a 20.4% yield had the following analysis:

| | Percent |
|---|---|
| 1-hexene | 52.6 |
| Trans-3-hexene | 10.6 |
| Trans-2-hexene | 22.2 |
| Cis-2-hexene | 9.7 |
| Trans-3-methyl-2-pentene | 1.8 |
| Cis-3-methyl-2-pentene | 2.7 |

The $C_4$ fraction, obtained in 45.1% yield, contained 74.5% 1-butene.

Example 6

In this example, the catalyst was prepared by impregnating 40 g. of the ammonium molybdate impregnated charcoal prepared in the first impregnation step of Example 5 with an aqueous cobaltous nitrate solution containing 6.6 g. of $Co(NO_3)_2 \cdot 6H_2O$ in 15 ml. of water. After air drying, the impregnated catalyst was heated overnight at a temperature of 80° C.–160° C. Before use in polymerization, the catalyst was activated by heating in a nitrogen atmosphere at a temperature of 315–360° C. for a period of 3.5 hours. It was further activated by treatment with hydrogen at 200° for 2 hours. This catalyst contained approximately 14.4 wt. percent combined CoO and $MoO_3$ and a cobalt oxide/molybdenum oxide ratio of 1:1 based on 0.00066 mole of CoO per gram of catalyst and 0.00066 mole of $MoO_3$ per gram of catalyst.

In conducting the polymerization, 54 g. of ethylene, 5.8 g. of the hydrogen activated catalyst, and 8.4 g. of toluene solvent were placed in a 300 ml. reaction vessel and heated at a temperature of 150–200° C. and a pressure in the range of from 1700 to 3000 p.s.i. for a period of 15 hours. Upon completion of the polymerization, the pressure was released and the liquid polymer was poured off of the catalyst for purification by distillation. The $C_6$ fraction, which was obtained in a yield of 22% had the following analysis:

| | Percent |
|---|---|
| 1-hexene | 84.5 |
| Trans-3-hexene | 3.5 |
| Trans-2-hexene | 8.4 |
| Cis-2-hexene | 3.1 |
| Trans-3-methyl-2-pentene | 0.3 |
| Cis-3-methyl-2-pentene | --- |

The C₄ fraction, obtained in 40% yield, contained 93% 1-butene.

Example 7

In this example, a CoCrO₄-activated charcoal catalyst was prepared by impregnating 150 g. of PBL charcoal with an aqueous ammonium chromate solution comprising 15.2 g. of (NH₄)₂CrO₄ in 140 ml. of water. After impregnating, the charcoal was evacuated to aid in pore penetration and the impregnated charcoal was dried in air at room temperature over the weekend. In the second impregnation step, 40 g. of this charcoal was impregnated with a cobaltous nitrate solution containing 5.5 g. of Co(NO₃)₂·6H₂O dissolved in 13 ml. of water. After the second impregnation step, the charcoal was evacuated and then dried in the air for a period of from 5 to 6 hours and then further dried in a vacuum oven at a temperature of 80° C.–150° C. overnight. Before use in polymerization, the catalyst was activated by heating in a nitrogen atmosphere at a temperature of 220–234° C. for a period of approximately 5 hours. This catalyst had a cobalt oxide/chromium oxide mole ratio of 1:1 based on 0.0006 mole of cobalt oxide per gram of catalyst and 0.0006 mole of CrO₃ per gram of catalyst.

In conducting the polymerization, 7.7 g. of the activated catalyst, 8.4 g. of toluene solvent, and 80.0 g. of ethylene were placed in a 300 ml. high pressure vessel and heated at a temperature of 160–200° C. for a period of 11.5 hours. Upon completion of the polymerization, the pressure vessel was opened and the liquid polymer removed for purification by distillation. The C₆ fraction, which was obtained in 29.3 yield, had the following analysis:

| | Percent |
|---|---|
| 1-hexene | 12.4 |
| Trans-3-hexene | 23.8 |
| Trans-2-hexene | 38.6 |
| Cis-2-hexene | 15.5 |
| Trans-3-methyl-2-pentene | 3.1 |
| Cis-3-methyl-2-pentene | 5.2 |
| 2-ethyl-1-butene | 0.7 |

The C₄ fraction, obtained in 32.5% yield, contained 25% 1-butene.

Example 8

In this example, the catalyst was the same as that used in Example 6 except that the treatment with hydrogen was eliminated.

In conducting the polymerization, 93 g. of propylene, 8.8 g. of toluene solvent and 6.4 g. of activated catalyst were placed in a 300 ml. high pressure reaction vessel and heated at 85° C. for 4–5 hours and at 150° C. for 12 hours. Upon completion of the reaction, the pressure was released and the liquid polymer was poured off the catalyst for purification by distillation. The C₆ fraction, which was obtained in 5% yield, had the following analysis:

| | Percent |
|---|---|
| 4-methyl-1-pentene | 8.6 |
| 4-methyl-2-pentene | 43.1 |
| 1-hexene | 5.4 |
| 2-methyl-1-pentene or trans-3-hexene | 1.7 |
| Cis-3- or trans-2-hexene | 15.1 |
| Cis-2-hexene | 27.9 |

Example 9

In this example, a catalyst consisting of active charcoal containing a mixture of cobalt oxide and vanadium oxide was prepared by dissolving 10 g. of V₂O₅ in 40 g. of water containing 22.1 g. of oxalic acid dihydrate at 85–90° C. This hot solution was filtered, the small amount of black insoluble material was rinsed with 10 ml. of hot water, and the combined filtrate and washings cooled and added to 50 g. of BPL charcoal. The resulting slurry was air dried overnight and then placed in a tube and heated at 380–425° C. for 4 hours under N₂ to give 54.2 g. of treated carbon. A portion of this treated carbon (29.9 g.) was then added to a solution containing 10 g. of Co(NO₃)₂·6H₂O dissolved in 20 ml. of water. After evacuating to force liquid into the pores of the charcoal, the impregnated charcoal was dried overnight in a vacuum oven at 80–150° C. and then heated at 328–370° C. for 4 hours in a tube under N₂ to give 32.3 g. of charcoal containing cobalt oxide and vanadium oxide. A 12.0 g. portion of this catalyst was further treated with 5.8 g. Co(NO₃)₂·6H₂O dissolved in 7 ml. of water, air dried several hours, dried in a vacuum oven overnight at 80–150° C. and finally activated at 290–330° C. for 4 hours in an atmosphere of N₂.

In conducting the polymerization, 6.2 g. of the activated catalyst containing cobalt oxide and vanadium oxide, 6.8 g. of n-heptane and 63 g. of ethylene were placed in a 300 ml. high pressure vessel and heated at 150–200° C. for 15 hours. Upon completion of the polymerization, the pressure vessel was cooled, opened and the liquid polymer removed for purification by distillation. The C₆ fraction, which was obtained in 25% yield, had the following analysis:

| | Percent |
|---|---|
| 1-hexene | 25.8 |
| Trans-3-hexene | 21.6 |
| Trans-2-hexene | 32.6 |
| Cis-2-hexene | 11.4 |
| Trans-3-methyl-2-pentene | 3.2 |
| Cis-3-methyl-2-pentene | 3.6 |
| 2-ethyl-1-butene | 1.9 |

The C₄ fraction, obtained in 42% yield, contained 53% 1-butene.

Example 10

This example illustrates the comparative advantage of using the mixed metal oxide on carbon catalyst of this invention instead of cobalt oxide on carbon catalyst for dimerizing liquid olefins.

Four catalysts were prepared:

(A) This catalyst was prepared by impregnating a commercially available activated carbon with cobalt nitrate solution in an amount equivalent to about 25% by weight of cobalt oxide in the cobaltous form. The catalyst was dried and activated by heating to 475° C. in flowing nitrogen.

(B) A 60 g. portion of 7% CoO/5% Cr₂O₃/C, prepared by sequentially impregnating a commercially available activated carbon with chromium nitrate (equivalent to 5% Cr₂O₃), drying, heating to 275° C. in an inert atmosphere, cooling, and then impregnating it with a cobalt nitrate solution (equivalent to 7% cobalt oxide), drying, and heating the resulting composition to 475° C. for three hours in flowing nitrogen (100 ml./min.).

(C) A cobalt salt-chromium salt co-impregnated catalyst was prepared by adding 88 g. of a commercially available coconut charcoal to a solution of 27.2 g. of cobalt nitrate hexahydrate (equivalent to 7.0 g. of CoO) and 26.3 g. of chromium nitrate nonahydrate in 85 ml. of water and drying in a vacuum oven the impregnated carbon thus obtained. A 65 g. portion of thus dried composition was activated by heating it to 475° C. in flowing nitrogen.

(D) An 80 g. portion of commercially available activated carbon was added to a solution of 26.3 g. of chromium nitrate nonahydrate (equivalent to 5 g. of Cr₂O₃) in 90 ml. of water, and the impregnated carbon thus obtained was vacuum oven dried. An 85 g. portion of the dried chromium oxide impregnated carbon thus obtained was added to a solution of 58.2 g. of cobalt nitrate hexahydrate (equivalent to 15 g. of cobalt oxide) in 100 ml. of water. The composition was dried as before and a 60 g. portion of the resulting composition was activated by heating it in flowing nitrogen to 475° C.

The runs were made in liquid olefin dimerization units wherein the liquid olefin feed was passed through a 60 g. portion of the respective catalysts at a constant rate, the temperature and pressure being held constant until the productivity in terms of grams of liquid product per gram of catalyst per hour reached a low level of below about 0.05 g. of liquid product per gram of catalyst per hour.

The reaction temperature was kept in a range of 140 to 160° C., mostly about 150° C. at about 250 p.s.i.g. by controlling the temperature of the catalyst at the top, middle, and bottom of the bed, the temperature of which varied from about 12° C. from top to bottom at start up to about 4° C. from top to bottom as the reaction conditions stabilized. The liquid feed, mixed n-hexenes, was fed to the unit at a rate of about 1.5 ml. per minute, which was equivalent to a space velocity of about 1.0 gram of liquid feed per hour for the apparatus used. The mixed n-hexene feed which did not dimerize was recycled as part of the feed.

The data for each run is summarized below:

| Catalyst | Productivity (g. $C_{12}$/g. catalyst/hr.) | | Total $C_6$ feed used (g.) | Total products, g. $C_{12}$/g. catalyst |
|---|---|---|---|---|
| | Initial | Terminal | | |
| (A) 25% CoO/C | 0.135 | 0.048 | 12,366 | 32.4 |
| (B) 7% CoO/5% $Cr_2O_3$/C a | 0.276 | 0.051 | 20,784 | 55.5 |
| (C) 7% CoO/5% $Cr_2O_3$/C b | 0.276 | 0.068 | 28,891 | 55.2 |
| (D) 15% CoO/5% $Cr_2O_3$/C | 0.120 | 0.067 | 7,645 | 12.4 | a Chromium nitrate impregnated first, and after drying and heating to decompose the nitrate, the cobalt nitrate was impregnated thereinto.
b Cobalt nitrate and chromium nitrate coimpregnated into the carbon.

Example 11

This example compares the liquid dimer olefin productivity obtained using catalysts containing (1) cobalt oxide on carbon only, (2) chromium oxide on carbon only, (3) cobalt oxide on chromium oxide on carbon, (4) cobalt oxide and chromium oxide co-impregnated on carbon.

Each catalyst was prepared by impregnating a commercially available activated carbon with the nitrate salt of the respective metal, cobalt or chromium, in an aqueous solution having a concentration which was equivalent to the desired amount of cobalt oxide, chromium oxide, or mixtures of the two metal oxides.

For one mixed cobalt oxide and chromium oxide catalyst, the chromium nitrate solution was impregnated into the carbon first, the impregnated carbon was dried, and heated in nitrogen to a temperature sufficient to decompose the chromium nitrate therein to the $Cr_2O_3$ oxide, and after cooling, the $Cr_2O_3$ on carbon composition was impregnated with the cobalt nitrate solution, and dried and heated in a similar manner. This is termed sequential impregnation.

For another mixed cobalt oxide and chromium oxide on activated carbon catalyst, the nitrate salts of the two metals were both dissolved in a common aqueous solution, and impregnated into the carbon by adding the carbon to the mixed metal nitrate solution thus obtained. The impregnated carbon was dried and activated in the same manner as the other impregnated compositions. This is termed a co-impregnation.

Each composition was activated by heating it in flowing nitrogen to about 450° C. for 3 to 5 hours.

Each catalyst was then used under similar conditions to dimerize liquid mixed normal hexenes at about 150° C. for three hours over about 75 g. portions of the respective catalysts. At the end of that time the rate productivity of each of the above catalysts in terms of grams of $C_{12}$ liquid olefin product per gram of catalyst per hour was as follows:

| Catalyst, percent | | Productivity, g. $C_{12}$/g. catalyst/hr. |
|---|---|---|
| CoO | $Cr_2O_3$ | |
| 13.5 | 0 | 0.19 |
| 0 | 11 | 0.006 |
| 0 | 5 | 0.003 |
| 7 | 5 | 0.37 |

The results show that the mixed cobalt oxide and chromium oxide on activated carbon are better than the cobalt oxide on activated carbon for dimerizing mixed isomer liquid olefins. The results also show that the use of a chromium oxide on carbon catalyst with no cobalt oxide therewith in the process gives substantially no productivity of liquid product.

Example 12

This example illustrates the effectiveness of the mixed cobalt oxide and chromium oxide on activated carbon catalyst compositions for the polymerization of internal olefins when the catalysts contained varying weight percent levels of cobalt oxide and chromium oxide.

These polymerizations were conducted in the manner described in Example 10 using hexene-2 as the representative internal olefin. Each catalyst was prepared by impregnating the activated carbon with chromium nitrate, drying the impregnated carbon, heating it in nitrogen to decompose the chromium nitrate to the chromium oxide, $Cr_2O_3$, cooling, impregnating the $Cr_2O_3$ impregnated carbon thus obtained with an aqueous solution of cobalt nitrate, drying, and activating it by heating it to 450° C. in flowing nitrogen for three hours.

The results were as follows:

| Catalyst, Percent | | Run Time (hrs.) | Productivity, g. $C_{12}$/g. of catalyst/hr. |
|---|---|---|---|
| CoO | $Cr_2O_3$ | | |
| 13 | 1 | 1 | .31 |
| 13 | 1 | 3 | .26 |
| 25 | 1 | 1 | .23 |
| 25 | 1 | 3 | .15 |
| 5 | 20 | 1 | .13 |
| 5 | 20 | 3 | .05 |
| 6 | 7 | 3 | .36 |
| 5 | 8 | 3 | .18 |
| 25 | 0 | 1 | .18 |
| 25 | 0 | 3 | .14 |

These data show that optimum results in terms of dimerization productivity are obtained using catalysts containing about 10% to about 20% of the combined weights of cobalt oxide and chromium oxide in the carbon, and that the best results seem to be obtained with catalysts containing about equal amounts of cobalt oxide and chromium oxide although catalysts containing lower amounts of cobalt oxide relative to the amount of chromium oxide are also effective for dimerizing liquid olefins.

Example 13

This example illustrates that the $C_{12}$ olefin product obtained from polymerizing mixed n-hexenes having predominent proportions of internal isomers using the catalysts of this invention have about the same isomer content as does the $C_{12}$ olefin product obtained using cobalt oxide only on carbon as the catalyst.

For this run, the liquid olefin products, obtained from the polymerization of batches of mixed n-hexenes using the respective catalysts, were hydrogenated under known conditions to obtain a mixture of alkane hydrocarbons. Upon analysis by vapor phase chromatography the $C_{12}$ alkane product contained the following isomer distirbution.

| Isomer | Percent Dodecane Isomer Distribution | |
|---|---|---|
| | 13% CoO/C | Catalyst Used: 7% CoO 5% $Cr_2O_3$/C |
| n-Dodecane | 8.7 | 7.7 |
| 5-methylundecane | 49.4 | 47.0 |
| 4-ethyldecane | 32.5 | 34.6 |
| 5,6-dimethyldecane | 3.7 | 4.3 |
| 4-ethyl-5-methylnonane | 5.2 | 5.8 |
| 4,4-diethyloctane | 0.5 | 0.5 |

The results show that about 88% of the $C_{12}$ olefin product obtained using the mixed cobalt oxide and chromium oxide on carbon catalysts of this invention are substantially straight chained products, i.e., this large fraction contains not more than 1 lower alkyl side chain.

I claim:

1. A process for the polymerization of a mono-olefin having from 2 to about 10 carbon atoms to a liquid olefin product which comprises contacting said mono-olefin under polymerization conditions with a catalyst consisting essentially of a major proportion of an adsorbent carbon and a minor proportion of a mixture of cobaltous oxide and an oxide of a metal selected from the group consisting of molybdenum, chromium, tungsten, and vanadium, the mole ratio of said cobaltous oxide to said oxide of a metal selected from the group consisting of molybdenum, chromium, tungsten, and vanadium being at least 1:1, and recovering the liquid polymer thus produced.

2. The process of claim 1 wherein said cobaltous oxide and said oxide of said metal comprise from 2 to 25% by weight of said catalyst.

3. The process of claim 1 wherein said oxide of said metal is molybdenum oxide.

4. The process of claim 1 wherein said oxide of said metal is chromium oxide.

5. The process of claim 1 wherein said mono-olefin is ethylene.

6. The process of claim 1 wherein said mono-olefin is propylene.

7. A process for the polymerization of a feed stock containing a normally gaseous mono-olefin having from 2 to 3 carbon atoms to form a normally liquid polymer comprising a mono-olefin, said process comprising contacting said feed stock and an added inert reaction medium under polymerization conditions with a catalyst consisting essentially of a major porportion of an adsorbent carbon and a minor proportion of a mixture of cobaltous oxide and an oxide of a metal selected from the group consisting of molybdenum, chromium, tungsten and vanadium, the mole ratio of said cobaltous oxide to said oxide of a metal selected from the group consisting of molybdenum, chromium, tungsten, and vanadium being at least 1:1, and recovering said normally liquid polymer as product of the process.

8. The process of claim 7 wherein said oxide of said metal is molybdenum oxide.

9. The process of claim 7 wherein said oxide of said metal is chromium oxide.

10. The process of claim 7 wherein said normally gaseous mono-olefin is ethylene.

11. The process of claim 7 wherein said normally gaseous mono-olefin is propylene.

12. The process of claim 7 wherein said cobaltous oxide and said oxide of said metal comprise from 2 to about 25% by weight of the catalyst.

13. A process for the polymerization of ethylene to form hexene-1, said process comprising contacting said ethylene and a paraffinic hydrocarbon reaction medium at an elevated pressure and a temperature within the range of from 50°–250° C. with a catalyst consisting essentiall of mixture of an adsorbent carbon, cobaltous oxide, and molybdenum oxide, the combined amount of cobaltous oxide and molybdenum oxide being about 11% by weight, the molar ratio of said cobaltous oxide to said molybdenum oxide being about 1:1, and recovering said hexene-1 as product of the process.

14. A process for the polymerization of a normally liquid mono-olefin feed containing mono-olefins of up to about 10 carbon atoms per molecule, said process comprising contacting said normally liquid mono-olefin feed at an elevated temperature and pressure within the range of from about 70° C. to about 250° C. with a catalyst consisting essentially of a mixture of an adsorbent carbon, cobaltous oxide and chromium oxide, the combined amount of cobalt oxide and chromium oxide being from about 10% to about 15% by weight, the molar ratio of said cobaltous oxide to said chromium oxide being in the range of about 1:2 to about 3:1, and recovering the liquid polymer product thus obtained.

15. The process of claim 14 wherein the normally liquid mono-olefin feed is a mixture of normal hexenes.

16. The process of claim 14 wherein the normally liquid mono-olefin feed contains hexene-2.

References Cited by the Examiner

UNITED STATES PATENTS

| 2,634,260 | 4/1953 | Carnahan | 260—683.15 X |
| 2,710,854 | 6/1955 | Seelig | 260—683.15 X |
| 2,824,089 | 2/1958 | Peters et al. | 260—683.15 |
| 2,825,721 | 3/1958 | Hogan et al. | 260—683.15 X |

PAUL M. COUGHLAN, JR., *Primary Examiner.*

ALPHONSO D. SULLIVAN, *Examiner.*